(12) United States Patent
Zunker

(10) Patent No.: US 7,901,148 B2
(45) Date of Patent: Mar. 8, 2011

(54) CAMERA CARRIER

(76) Inventor: Kelly Zunker, Parker, CO (US)

( * ) Notice: Subject to any disclaimer, the term of this patent is extended or adjusted under 35 U.S.C. 154(b) by 118 days.

(21) Appl. No.: 12/321,024

(22) Filed: Jan. 13, 2009

(65) Prior Publication Data

US 2010/0178048 A1 Jul. 15, 2010

(51) Int. Cl.
*G03B 17/00* (2006.01)
(52) U.S. Cl. .......................................... 396/428; 396/419
(58) Field of Classification Search .................. 396/419, 396/422, 428
See application file for complete search history.

(56) References Cited

U.S. PATENT DOCUMENTS

| | | | | |
|---|---|---|---|---|
| 4,618,035 A | * | 10/1986 | Mao | 190/18 A |
| 4,714,184 A | * | 12/1987 | Young et al. | 224/673 |
| 4,896,897 A | * | 1/1990 | Wilhelm | 280/655 |
| 5,806,734 A | * | 9/1998 | Scott | 224/265 |
| D533,994 S | * | 12/2006 | Hussaini et al. | D3/218 |

* cited by examiner

*Primary Examiner* — Christopher E Mahoney
*Assistant Examiner* — Linda B Smith

(57) ABSTRACT

The invention is a camera holder, comprising an upper rigid element adapted for suspension from a substantially horizontal strap or belt and a lower rigid element with a substantially circular portion and a substantially rectangular portion, the substantially rectangular portion further comprising a coupling means adapted to enable flexible coupling of the lower rigid element to the upper rigid element. According to the invention, a coupling means of the lower rigid element allows it to alternatively be positioned substantially parallel to or substantially perpendicular to the upper rigid element, so that the lower rigid element, when positioned substantially perpendicular to the upper rigid element, is capable of supporting the weight of a camera or similar portable device. The diameter of the substantially circular portion of the lower rigid element is sufficiently large to permit passage of lenses or similar appurtenances of a camera or similar portable device.

1 Claim, 5 Drawing Sheets

CAMERA CARRIER

BACKGROUND OF THE INVENTION

1. Field of the Invention

Figure 1:
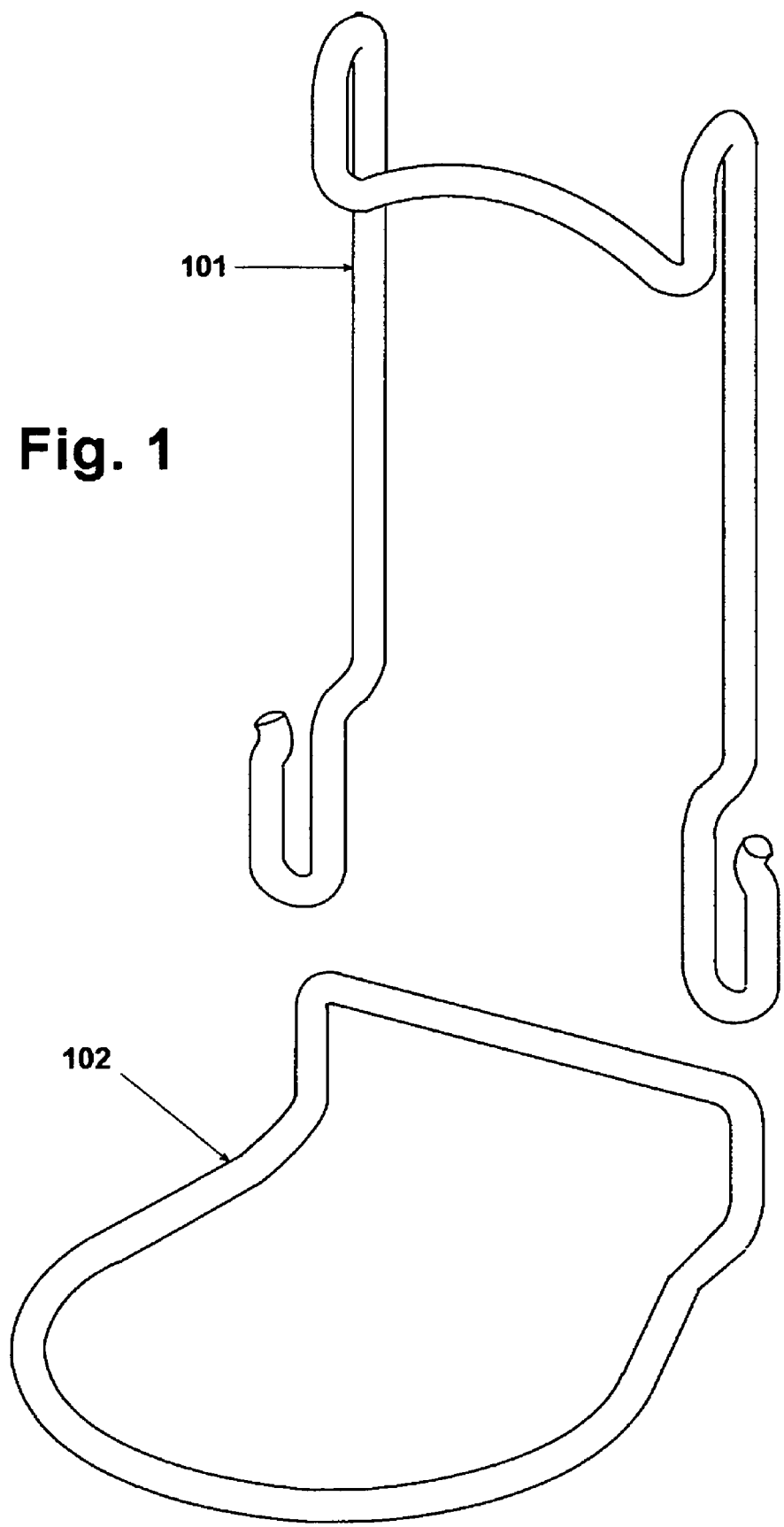

The present invention relates generally to an apparatus for holding a camera or other portable device. It relates more specifically to an apparatus for conveniently suspending a camera from a strap, cord or belt allowing hands-free transport and easy utilization of the camera or device.

2. Discussion of the State of the Art

In the field of photography it is often useful for the photographer to have a camera at hand and ready to use, without the encumbrance of having to manually carry it. Three traditional modes of transportation have been utilized in the past, none of which adequately solves the problem. A camera can be hand carried, it can be attached to a strap about the neck, or it can be carried in a case.

Carrying the camera manually is not always feasible, as many outdoor photographers will attest. A photographer often needs hands to assist in climbing certain terrain, and the camera would not only be a hindrance, but would also quickly fatigue the user. The camera could also be susceptible to damage from being bumped, knocked or dropped, thus ruining the photography expedition altogether. This first and most simple method of transport is therefore also the most difficult and strenuous for the photographer and the most hazardous to the camera or other device.

The suspension of a camera from a strap around the neck can quickly become a cumbersome nuisance or worse, as a freely swinging weight is suspended for long periods from the user's neck. A camera is a sizable item to carry in this fashion, and it becomes tiring to the photographer to do so for long periods of time. The transportation of a camera on a strap around the neck does allow for the camera to be readily at hand, but it also allows the camera to swing too freely and to be subject to smashing either on hard surfaces in the environment or on the body of the photographer, inflicting damage to either the camera or the photographer's person. In order to minimize these possible risks, the photographer typically uses at least one hand to stabilize the camera, thereby losing some of the freedom of movement needed for traversing certain terrain. This second method of transport encumbers the photographer and is fraught with the danger of damaging the camera quite possibly beyond repair.

Carrying a camera or other portable device in a case does allow for safe transportation, but it does not allow the photographer to have the camera or device readily available should the need arise to use it. Although some camera cases are small enough to not be much more of a weight burden than the actual camera itself, most professional camera cases do not fall into this category. Camera cases can be as large and as unwieldy as medium-sized suitcases. These large cases have room for all of the necessary items that a photographer might need, and can be carried by hand via straps or handles or as a backpack on the back. However, neither approach keeps the camera at the ready for spontaneous photographs. This third method for transportation of a camera totally eliminates the possibility of immediate use as for nature or sport photography, or candid photographs as the camera is most definitely not at hand.

A photographer could conceivably use a backpack type of case and also keep a camera on a strap around the neck, which would maintain a camera at hand, but it would be neither comfortable nor safe for the camera. These problems led to the invention of the camera carrier disclosed herein. Effective camera carriers should be able to contain a camera quite safely suspended from a strap, cord or belt located at the discretion of the photographer. A photographer will be able, using the instant invention, to carry a backpack with whatever gear is deemed necessary, have both hands free for climbing or other necessary activities, yet also have a camera safely at the ready for immediate picture taking. The present invention solves all of the aforementioned camera portability problems plaguing today's photographer, whether that photographer is taking photographs of a wedding in progress or a wildlife safari, as will be evident upon reading to those skilled in the art.

SUMMARY OF THE INVENTION

In an effort to solve the problems described above of providing comfortable, secure and flexible stowage of cameras or similar portable equipment, particularly so that the camera or similar equipment can be readily retrieved and used in any situation from the stowed position, the inventor conceived the camera holder of the present invention.

In a preferred embodiment of the invention, a camera holder comprising an upper rigid element adapted for suspension from a substantially horizontal strap or belt, and a lower rigid element with a substantially circular portion and a substantially rectangular portion, the substantially rectangular portion further comprising a coupling means adapted to enable flexible coupling of the lower rigid element to the upper rigid element, is disclosed. According to this embodiment, the coupling means of the lower rigid element allows the lower rigid element to alternatively be positioned substantially parallel to or substantially perpendicular to the upper rigid element, and the lower rigid element, when positioned substantially perpendicular to the upper rigid element, is capable of supporting the weight of a camera or similar portable device. Furthermore, according to this embodiment, the diameter of the substantially circular portion of the lower rigid element is sufficiently large to permit passage of lenses or similar appurtenances of a camera or similar portable device.

In another preferred embodiment of the invention, a camera holder comprising an upper rigid element adapted for suspension from a substantially horizontal strap or belt, and a lower rigid element with a substantially circular portion and a substantially rectangular portion, the substantially rectangular portion further comprising a coupling means adapted to enable flexible coupling of the lower rigid element to the upper rigid element, and a collapsible cylindrical enclosure with one open end adapted for suspension from the substantially circular portion of the lower rigid element and having an integral spring adapted to keep the enclosure collapsed when not in use, is disclosed.

According to this embodiment, the coupling means of the lower rigid element allows the lower rigid element to alternatively be positioned substantially parallel to or substantially perpendicular to the upper rigid element, and the lower rigid element, when positioned substantially perpendicular to the upper rigid element, is capable of supporting the weight of a camera or similar portable device. Furthermore, according to this embodiment, the diameter of the substantially circular portion of the lower rigid element is sufficiently large to permit passage of lenses or similar appurtenances of a camera or similar portable device, and the collapsible cylindrical enclosure extends against the spring's tension when a lens or similar appurtenance of the camera or similar portable device is inserted through the substantially circular portion of the lower rigid element, protecting the inserted appurtenance from damage or loss of any loose parts thereof.

BRIEF DESCRIPTION OF THE DRAWING FIGURES

FIG. 1. is a drawing of two separate interlocking pieces of an embodiment of the invention.

Figure 2:
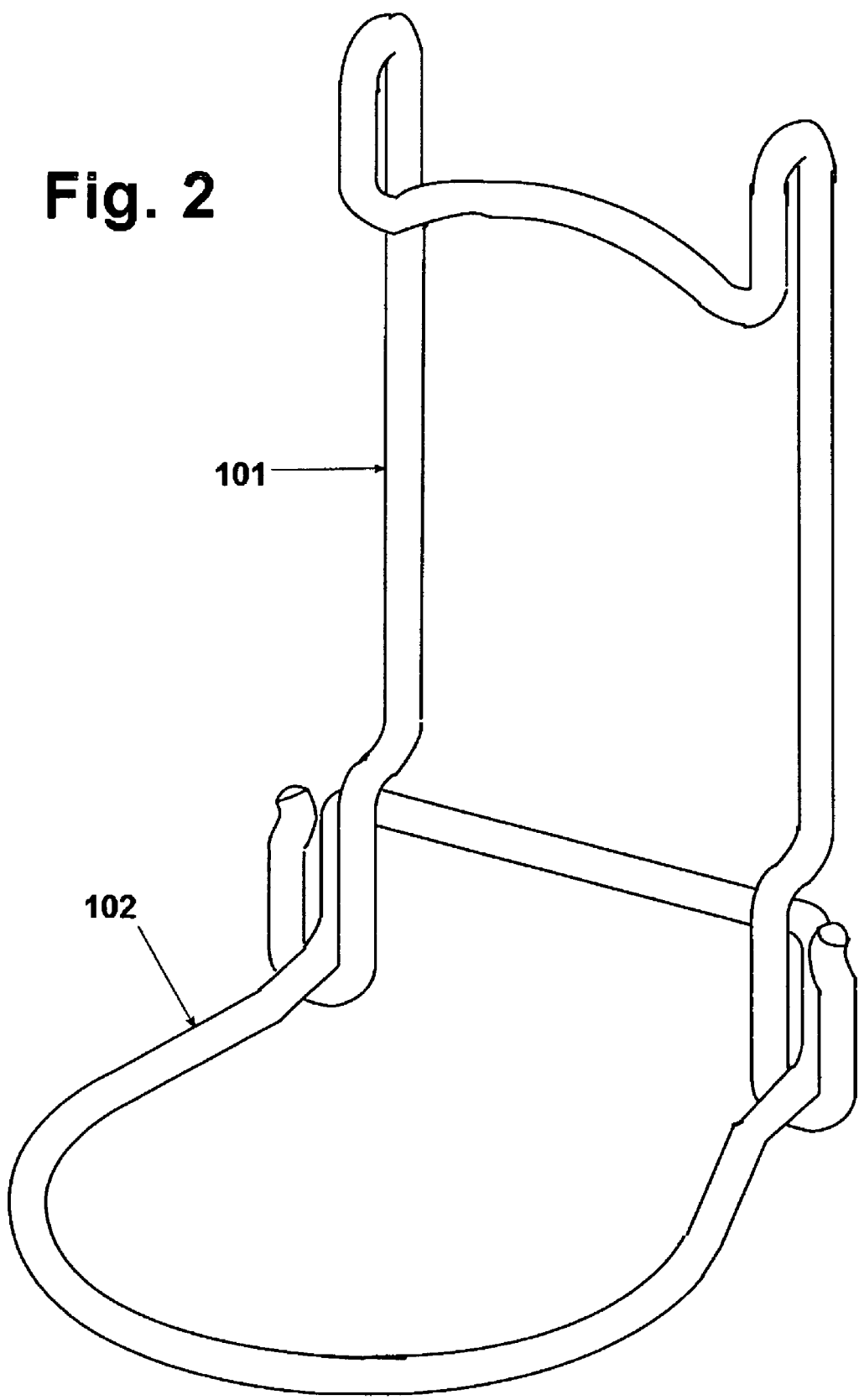

FIG. 2. is a drawing of an embodiment of the invention, interlocked and unfolded and ready for use.

Figure 3:
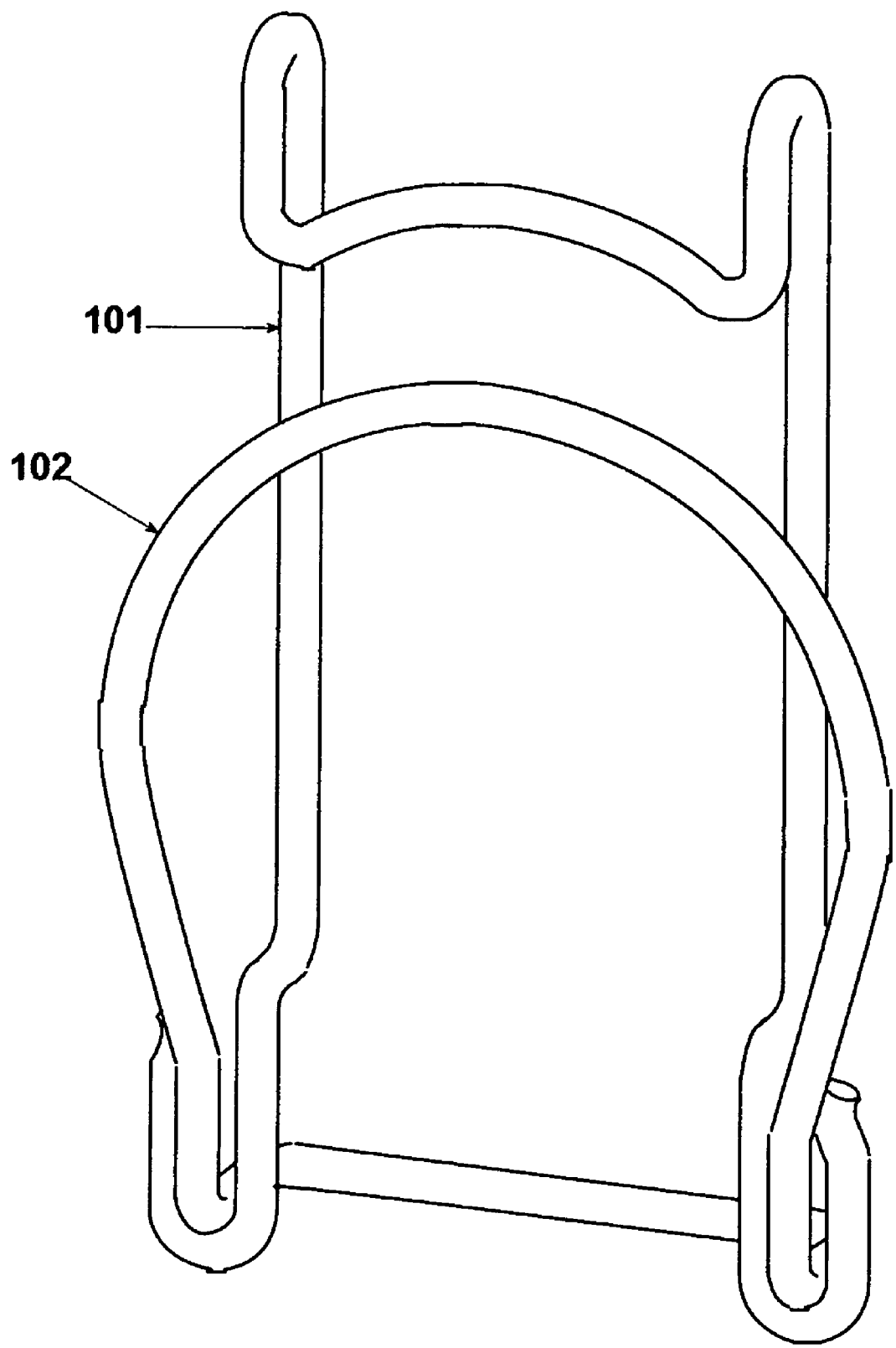

FIG. 3. is a drawing of an embodiment of the invention folded for ease of storing.

Figure 4:
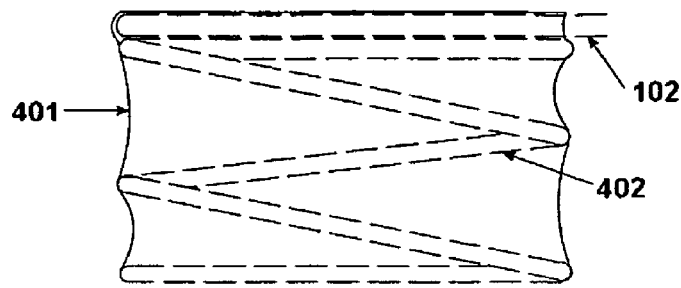
Figure 4:
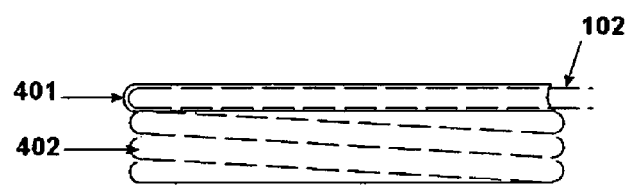

FIG. 4. is a drawing of a protective cover according to the invention.

Figure 5:
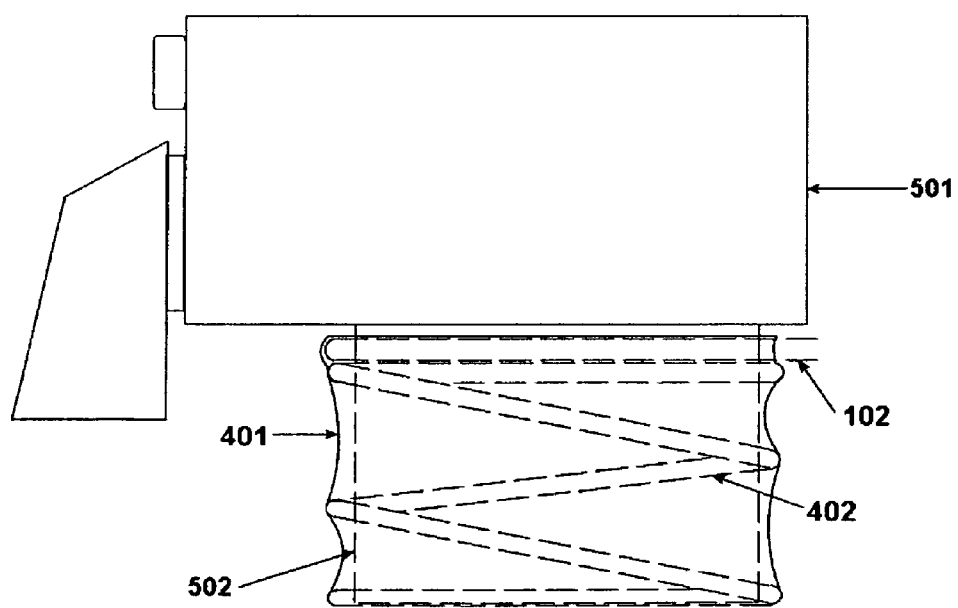

FIG. 5. is an illustration of a camera resting in a camera carrier according to the invention.

Figure 6:
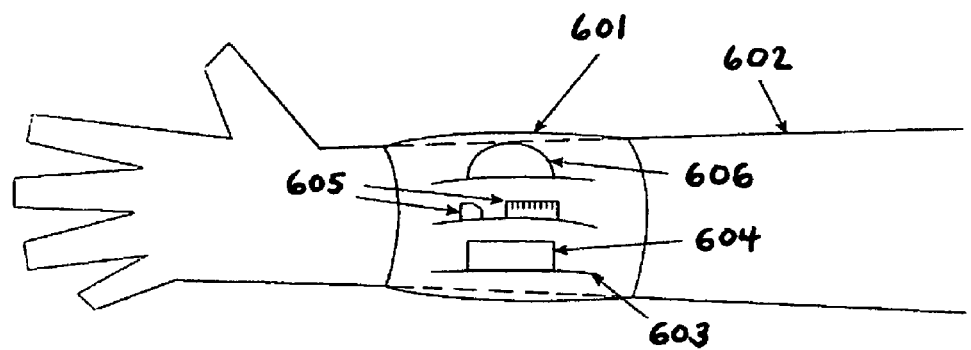

FIG. 6. is an illustration of an armband carrying device according to the invention.

Figure 7:
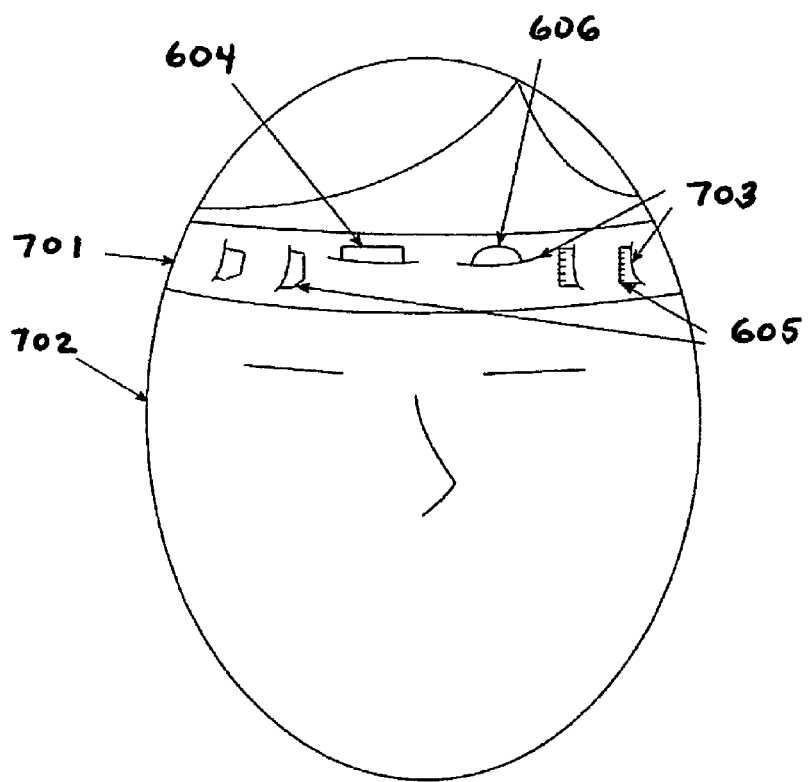

FIG. 7. is an illustration of a headband carrying device according to the invention.

DETAILED DESCRIPTION

FIG. 1 illustrates a preferred embodiment of the invention consisting of two separate interlocking pieces 101 and 102, each composed of a rigid material such as steel, aluminum, other metals or metal alloys, plastic or the like. In a preferred embodiment the rigid elements could be made of metal such as steel, further coated with a plastic or other flexible coating for rust prevention and to eliminate scratching and/or rubbing on the camera. Coating of the rigid elements is not required, and it need not be applied over the entire length of either element. An upper rigid element 101 comprises two equally-long coplanar side portions connected by a substantially shorter transverse portion that is also coplanar. The upper rigid element 101 is further adapted for suspension from a belt, strap or similar item by bending an upper portion of the upper rigid element 101 substantially back on itself to form a space between the smaller, bent back portion and the main body of the rigid upper element 101, so that a belt or similar item can be inserted between the bent back portion and the main body of the rigid upper element 101. The lower portion of the upper rigid element 101 is bent first forward, meaning the bend is out of the plane of the rigid upper element 101 in the same direction as the bent upper portion, which in a preferred embodiment is away from the body of the wearer. The lower bent-forward portion of the rigid upper element 101 is further bent in the opposite direction such that the lowermost portion of the upper rigid element 101 is returned to an orientation that is substantially parallel to the main and unbent portion of the upper rigid element 101, the parallel portion being offset from the plane of the main portion of the upper rigid element by a distance preferably at least equal to the diameter of the rigid material from which the lower rigid element 102 is made, and then each lowermost end of the upper rigid element 101 is bent back on itself outwardly to the side to form two small looped spaces coplanar to the main portion of the upper rigid element 101, one loop on each side, to accommodate the insertion of a lower rigid element 102. The end, or terminus, of each of the two small side loops is further bent slightly inward in order to prevent an inserted piece such as lower rigid element 102 from falling out.

A closed lower rigid element 102 is adapted to fit both behind and through the looped spaces of the lower bent back portion of the upper rigid element 101, for support of a camera or other portable device. The lower rigid element 102 can be manufactured in several ways known in the art, including bending of a single rigid rod into the shape described herein, or directly casting the lower rigid element 102. The lower rigid element 102 consists of a substantially circular portion joined to a substantially rectangular portion. The substantially circular portion has a radius larger than the normal average radius of type of object to be supported by the invention. In a preferred embodiment, the substantially circular portion has a radius larger than a typical single-lens reflex camera lens, or approximately 3.5 inches. In a preferred embodiment, the substantially circular portion of the lower rigid element is coated as described above with a plastic or rubber-like coating to protect any protruding lens or other appurtenance of the camera or other portable device, and to provide a smooth surface on which the camera or other portable device will rest when stowed according to the invention.

The substantially rectangular portion is joined with the substantially circular portion such that the parallel portions of the substantially rectangular portion of the lower rigid element 102 are separated by a distance substantially equal to the distance between the centerline of the two small side loops of the upper rigid element. The substantially rectangular portion of the lower rigid element 102 is bent upwards from the main plane of the lower rigid element 102 at approximately the midpoint of each of the parallel elements of the substantially rectangular portion in order to fit behind the lower portion of the upper rigid element 101.

FIG. 2 illustrates a preferred embodiment of the assembled invention consisting of an upper rigid element 101 and a lower, interlocking rigid element 102. The posterior upward bend of the lower rigid element 102 interlocks behind the forward (away from the body of the wearer) bend in the lower portion of the upper rigid element 101 and through the outwardly looped spaces of the lower portion of the upper rigid element 101, yielding an effective hinge and a transverse element which limits the downward motion of the lower rigid element 102 such that the substantially circular portion is substantially perpendicular to the plane of the main portion of the upper rigid element 101 and the user's body. It will be appreciated by one practiced in the art that alternate means of hinging or flexibly connecting the upper and lower rigid elements are possible, for example, pins or rivets or other suitable fasteners. The remaining portion of the lower rigid element 102 then projects forward from the upward bend, away from the body of the wearer.

FIG. 3 illustrates a preferred embodiment of the invention in which an lower rigid element 102 is adapted to interlock with an upper rigid element 101 so that it is essentially parallel to the upper lower element, rendering the embodiment easily stowable, for example in a camera equipment bag when not needed. The folding is enabled by a hinge between the upper rigid element 101 and the lower rigid element 102 and is formed from the interlocking of these two elements via the bends shown and described in FIG. 2 and its accompanying text. This hinge enables the invention to fold for ease of storage when not in use, and to open readily for use. This type of hinge also enables cameras, even with large heavy lenses attached, to be adequately and securely supported due to the upwardly bent portion of the lower rigid element 102 which fits behind the forward bent portion of the upper rigid element 101, without rupture of or damage to the hinge.

FIG. 4 illustrates a preferred embodiment of the invention that includes a collapsible protective covering 401 for a camera lens or other similar portable device. The protective covering 401 fits on or over the rim of the substantially circular portion of the lower rigid element 102 and encases a camera lens or other similar appurtenance to a camera or other portable device. In a preferred embodiment this protective covering is made of nylon fabric, although other types of fabric, coated fabric, flexible plastic, vinyl, leather, suede or leather-like or suede-like material, or other similar flexible material can also be used. The protective covering 401, being made of flexible material, has a spring 402 either in or on it so that when there is no camera lens or similar portable device within protective covering 401, said protective covering 401 retracts or folds up under spring tension for ease of storage and to reduce hindrance to the user during those times when no camera or similar device is contained in the invention. According to the invention, the tension of the spring is adjusted so that, when placing a camera or like device into the invention the protective covering extends with minimal effort (the weight of the camera essentially counteracting the spring's tension). According to various embodiments of the invention, the spring 402 can be attached to the inside surface of the protective covering, the outside surface of the protective covering, or between two layers of the protective covering for the lens. The spring 402 can be constructed of metal, metal alloy, plastic or any material useful and adequate for creating a spring.

In a further embodiment of the invention, the protective covering 401 is mounted on the weight-carrying or lower surface of a camera-carrying bag or other similar equipment container rather than the substantially circular portion of the lower rigid element 102. In this configuration, a user is enabled to stow a camera or similar portable equipment with a lens or similar appurtenance in a carrying bag without removing the lens or similar appurtenance, as the lens will act against the spring tension of the protective covering 401 and extend the covering sufficiently to allow the camera body to rest on the weight-carrying or lower surface of the bag or container. This would be useful, for example, when a photographer carries two cameras, each with a lens, and has one of them mounted in the lower rigid element 102 as described above (and thus ready for immediate use), and has the other one stowed in a carrying case with the lens still affixed, thereby making it possible to quickly switch from one camera to the other without having to add or remove lenses as is currently required.

FIG. 5 illustrates a general single-lens reflex camera 501 with lens affixed 502, resting in the fully assembled and open bottom rigid element 102 of the camera carrier of the invention, with the camera lens 502 in the protective cover 401 which is extended against the tension of the spring 402.

FIG. 6 illustrates a preferred embodiment of an armband carrying device 601 of the invention with pockets, slots, folds, straps or similar 603 for carrying small items such as memory sticks or cards or other portable memory devices 605, lens covers 606, lens wipes 604 or similar accoutrements useful for a camera or similar portable device. In a preferred embodiment this armband carrying device 601 could be made of elasticized fabric, non-elasticized fabric, coated fabric, leather, suede, vinyl, plastic or other similar flexible material with or without a attachment closures as dictated by the needs of the material.

FIG. 7 illustrates a preferred embodiment of a headband carrying device 701 with pockets, slots, folds, straps or similar 703 for carrying small items such as memory sticks or cards or other portable memory devices 605, lens covers 606, lens wipes 604 or similar accoutrements useful for a camera or similar portable device. In a preferred embodiment this arm band type of carrying device 701 could be made of elasticized fabric, non-elasticized fabric, coated fabric, leather, suede, vinyl, plastic, or other similar flexible material with or without a type of attachment closure as dictated by the needs of the material.

All of the embodiments outlined in this disclosure are exemplary in nature and should not be construed as limitations of the invention except as claimed below.

What is claimed is:

1. A camera holder, comprising:
   an upper rigid element adapted for suspension from a substantially horizontal strap or belt;
   a lower rigid element with a substantially circular portion and a substantially rectangular portion, the substantially rectangular portion further comprising a coupling means adapted to enable flexible coupling of the lower rigid element to the upper rigid element; and
   a collapsible cylindrical enclosure with one open end adapted for suspension from the substantially circular portion of the lower rigid element and having an integral spring adapted to keep the enclosure collapsed when not in use;
   wherein the coupling means of the lower rigid element allows the lower rigid element to alternatively be positioned substantially parallel to or substantially perpendicular to the upper rigid element, and
   wherein the lower rigid element, when positioned substantially perpendicular to the upper rigid element, is capable of supporting the weight of a camera or similar portable device; and
   wherein the diameter of the substantially circular portion of the lower rigid element is sufficiently large to permit passage of lenses or similar appurtenances of a camera or similar portable device; and
   wherein the collapsible cylindrical enclosure extends against the spring's tension when a lens or similar appurtenance of the camera or similar portable device is inserted through the substantially circular portion of the lower rigid element, protecting the inserted appurtenance from damage or loss of any loose parts thereof.

* * * * *